(12) United States Patent  
Holland

(10) Patent No.: US 9,352,336 B2  
(45) Date of Patent: *May 31, 2016

(54) METHOD AND APPARATUS FOR TREATING FLUID COLUMNS

(71) Applicant: Wilsa Holdings, LLC, Houston, TX (US)

(72) Inventor: Herbert William Holland, Houston, TX (US)

(73) Assignee: Wilsa Holdings, LLC, Houston, TX (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/249,737

(22) Filed: Apr. 10, 2014

(65) Prior Publication Data

US 2014/0216937 A1    Aug. 7, 2014

Related U.S. Application Data

(63) Continuation of application No. 12/655,206, filed on Dec. 26, 2009, now Pat. No. 8,709,256.

(51) Int. Cl.
```
B03C 5/02      (2006.01)
C02F 1/48      (2006.01)
C02F 101/32    (2006.01)
```

(52) U.S. Cl.
CPC . *B03C 5/02* (2013.01); *C02F 1/487* (2013.01); *C02F 2101/32* (2013.01); *C02F 2201/483* (2013.01); *C02F 2303/22* (2013.01)

(58) Field of Classification Search
CPC .............. C02F 1/487; C02F 2101/32; C02F 2201/483; C02F 2303/22; B03C 5/02
USPC ............. 210/48.01, 748.02, 748.03, 748.16, 210/748.17, 748.19, 748.2, 749, 757, 758, 210/759, 760, 764, 767, 753, 710.03, 210/170.07, 170.08, 170.1, 198.1, 200, 201, 210/202, 203, 205, 209, 241, 242.4, 243, 210/251, 252, 260, 294, 322, 324, 349, 399, 210/418.3, 418.5, 433.1, 513; 422/20, 22, 422/27, 129, 186, 186.03, 186.04, 186.16, 422/186.26, 186.27, 186.28, 243; 204/557, 204/664, 155, 156, 157.15, 157.42, 157.62, 204/164, 176, 193, 194

See application file for complete search history.

(56) References Cited

U.S. PATENT DOCUMENTS 6,261,525 B1 * 7/2001 Minaee ................ B01J 19/126
                                                219/678

* cited by examiner

*Primary Examiner* — Walter D Griffin
*Assistant Examiner* — Cameron J Allen
(74) *Attorney, Agent, or Firm* — Dunlap Codding, P.C.

(57) ABSTRACT

Methods and apparatuses are disclosed including a method of neutralizing charges of solid contaminants and weakening cell walls and membranes of biological contaminants in a fluid, comprising the steps of: establishing a flow of a fluid through a fluid treatment chamber surrounded by a sidewall of a fluid treatment vessel shaped as a conduit having a fluid input port, and a fluid output port, the sidewall constructed of a shielding material; and energizing a coil of at least one antenna within the fluid treatment chamber with at least one electrical energizing unit to produce pulsed radiation within the fluid treatment chamber to treat the flow of the fluid therein, wherein the sidewall of the fluid treatment vessel establishes a chamber having a capacity to restrict propagation of the pulsed radiation out of the fluid treatment vessel.

23 Claims, 1 Drawing Sheet

METHOD AND APPARATUS FOR TREATING FLUID COLUMNS

INCORPORATION BY REFERENCE

The present patent application claims priority to U.S. patent application Ser. No. 12/655,206 titled METHOD AND APPARATUS FOR TREATING FLUID COLUMNS, filed on Dec. 26, 2009, the entire contents of which are hereby expressly incorporated herein by reference.

BACKGROUND OF THE INVENTION

The instant invention relates to a method and apparatus for treating fluid columns to prevent the formation of scale and other flow restricting deposits within conduits utilized in the transmission of fluids. The instant method and apparatus may also be utilized to extract deposits from the surfaces of conduits and other components of fluid transmission systems, accelerate the separation of contaminants from a fluid and reduce the amount of chemicals required for the maintenance, treatment and processing of many fluids.

Thermal exchange systems comprising components such as boilers, heat exchangers and cooling towers utilize water as a heat transfer medium. Suspended and dissolved minerals precipitate out of the water and accumulate as deposits of scale on the surfaces of thermal exchange system components and restrict the flow of water, act as insulation that inhibits heat transfer from one surface to another, impede the operation of equipment and increase energy consumption as the fouled systems lose efficiency and labor to meet operational parameters. Fouled heat exchange systems must undergo descaling processes to recover lost productivity and reduce energy consumption at a significant expense, not only for the cost of cleaning system components but also for lost productivity while a facility is out of service as the fouled thermal exchange system is descaled.

Chemical treatment is a common means of controlling scale, corrosion, algae, bacteria and other biological contaminants in thermal exchange systems and is also commonly used to remove suspended or dissolved solid contaminants from process water, make-up water, industrial storm water and wastewater. Utilization of chemicals is costly, requires the storage, handling and dispensing of dangerous substances and poses increasing environmental concerns. As chemicals, minerals and other contaminants accumulate in thermal exchange systems, the water becomes unsuitable for continued use and a fresh supply of water is required for the ongoing operation of such systems. Contaminant laden water from such systems typically incurs large surcharges for wastewater disposal due to the treatment needed to render the water suitable for discharge into the environment.

In petroleum production, water, paraffin and minerals entrained in petroleum production fluids extracted from oil producing formations are separated from marketable oil by bulk recovery apparatus. Water extracted from crude oil is typically returned to the formation while recovered petroleum containing residual amounts of water and contaminants is transported to a refinery for processing into commodities. Over time, deposits of scale and other contaminants form within the separation equipment used to remove water from oil, conduits utilized to return water to the formation and pipelines used to transport crude oil to a refinery; resulting in restricted fluid flow, limited capacity of fluid transmission systems and the deterioration of pumps, valves, meters and other equipment. Productivity is lost when costly physical cleaning and chemical remediation are required to restore full flow to petroleum production and transmission systems. Refineries, as well as other industrial complexes, are constantly challenged with remediation of hydrocarbon contaminants that migrate into storm water and wastewater systems.

Prior art apparatus use a length of wire coiled around the outer surface of a pipe to form an antenna that is then energized with electrical energy switched on and off at a frequency of 2 kHz-20 kHz in an effort to replace chemical treatment. Prior art apparatus are challenged by a number of deficiencies. Energizing an antenna with electrical energy continuously switched on and off at a frequency of 2 kHz-20 kHz generates a signal that radiates from the coiled wire, and because the signal radiates from the antenna only a limited area of the flow channel within the pipe receives the signal. Prior art apparatus attempt to treat pipes greater than 1" in diameter by amplifying their signals to treat a broader cross section within the pipe. However, amplification merely results in the signal radiating farther from the coiled wire and typically fails to treat a broader cross section of the flow channel within larger diameter conduits.

Further, such prior art devices fail to shield the signals they generate and are susceptible to interference from stronger signals of other devices that can limit the efficiency of the fluid treatment they provide. The unshielded signals of prior art devices also radiate from the coil and may interfere with radio controlled devices, such as apparatus utilized in telemetering data and equipment.

SUMMARY OF THE INVENTION

The instant invention includes a method of providing fluid treatment, comprising the steps of providing a fluid treatment vessel defining a fluid impervious boundary wall with an inner surface and having a fluid input port and a fluid output port, the inner surface of said fluid impervious boundary wall establishing a fluid treatment chamber; providing at least one transducer to direct at least one pulsed electromagnetic wave proximate at least one distinct region within the fluid treatment chamber, each at least one transducer comprising at least one length of electrical conducting material having a first conductor lead and a second conductor lead and forming at least one antenna; providing at least one electrical energizing unit having a capacity to produce at least one distinct programmable output of electrical energy continuously switched on and off at a pulsed repetition rate to establish at least one pulsed electrical signal; providing at least one shielding material member to restrict radiation of the at least one pulsed electrical signal, said at least one shielding material member further reducing external interference with said at least one pulsed electrical signal; providing means for deploying the at least one transducer within the fluid treatment chamber; and providing means for deploying the at least one shielding material member to restrict propagation of the at least one pulsed electrical signal. The instant method further comprises connecting the conductor leads of the at least one transducer to the at least one electrical energizing unit to energize said at least one transducer with at least one pulsed electrical signal and thereby produce at least one pulsed electromagnetic wave directed proximate at least one distinct region within the fluid treatment chamber and establishing at least one region of pulsed fluid treatment within said fluid treatment chamber; introducing a feed stream comprising a fluid column receptive to pulsed fluid treatment to the fluid inlet port of the fluid treatment vessel to establish a flow of the fluid to be treated through the fluid treatment chamber; directing the fluid to pass through at least one region of pulsed fluid treatment; and discharging the feed stream exiting from the fluid outlet port of the fluid treatment vessel as a processed fluid.

The instant method of fluid treatment may include one or more of the steps of dispersing a supply of at least one fluid treatment chemical into the feed stream, directing the feed steam to pass through at least one contaminant separation process or directing the feed steam to pass through at least one fluid flow conditioning process.

The instant invention may be utilized to improve the efficiency of apparatus utilized in solid/liquid phase separation or liquid/liquid separation (such as oil/water separation) and may also be effective in controlling and eliminating many biological contaminants. Unlike chemical treatment, the instant invention typically will not over treat or under treat a feedstock and requires little monitoring or adjustment for effective fluid treatment. Suspended and dissolved contaminants within many fluid columns may be rendered non-adhesive and inhibit their accumulation as deposits within conduits and on the surfaces of equipment. The instant invention may be utilized in single pass fluid treatment applications and closed-loop fluid transmission systems.

BRIEF DESCRIPTION OF THE DRAWINGS

The accompanying drawings illustrate the preferred embodiments of the invention in which.

DESCRIPTION OF THE PREFERRED EMBODIMENT

The instant invention includes an apparatus providing fluid treatment, comprising a fluid treatment vessel defining a fluid impervious boundary wall with an inner surface and having a fluid input port and a fluid output port, the inner surface of said fluid impervious boundary wall establishing a fluid treatment chamber; at least one transducer to direct at least one pulsed electromagnetic wave proximate at least one distinct region within the fluid treatment chamber, each at least one transducer comprising at least one length of electrical conducting material having a first conductor lead and a second conductor lead and forming at least one antenna; means for deploying the at least one transducer within the fluid treatment chamber; at least one electrical energizing unit coupled to the at least one transducer, said at least one electrical energizing unit providing at least one distinct programmable output of electrical energy continuously switched on and off at a pulsed repetition rate to establish at least one pulsed electrical signal to energize the at least one transducer and thereby produce at least one pulsed electromagnetic wave directed proximate at least one distinct region within the fluid treatment chamber; at least one shielding material member having a capacity to restrict radiation of the at least one pulsed electrical signal, said at least one shielding material member further reducing external interference with said at least one pulsed electrical signal; and means for deploying the at least one shielding material member to restrict propagation of the at least one pulsed electrical signal.

A feed stream receptive to fluid treatment may be directed to make a single pass through the pulsed fluid treatment device or may be directed to make at least one additional pass through the pulsed fluid treatment device. In some applications, a feed stream may be directed to pass through the pulsed fluid treatment device as a continuous flow of fluid, but in other instances a feed stream may be directed to flow into an embodiment of the fluid treatment vessel comprising a collection basin, settling tank, retention pond or similar type of reservoir to allow for gravity separation of suspended and dissolved solids in the feed stream prior to discharging processed fluid from the fluid treatment vessel. At least one transducer may be deployed within a collection basin, settling tank or retention pond to direct pulsed fluid treatment to fluid retained within a reservoir.

Figure 1:
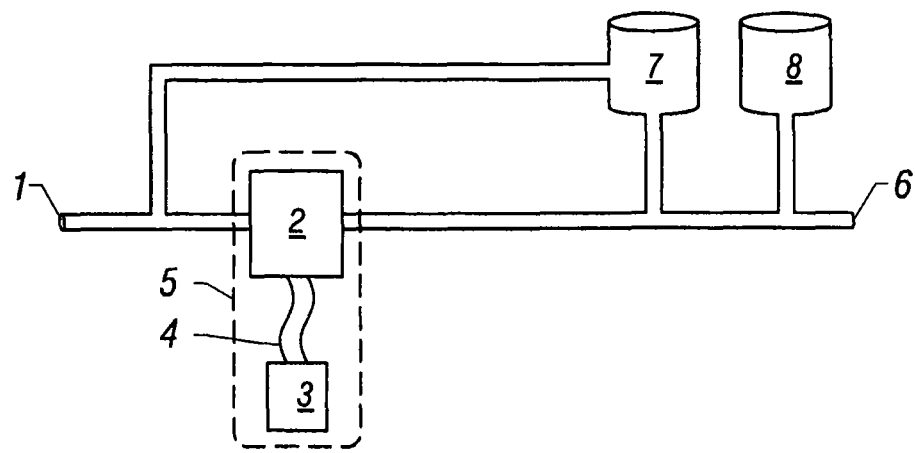
FIG. 1 shows the configuration of the instant invention in a fluid treatment system.

FIG. 1 shows a configuration of the instant invention in a fluid treatment system wherein a feed stream receptive to fluid treatment introduced to port 1 may be directed to pass through at least one pulsed electromagnetic wave within fluid treatment vessel 2. First and second conductor leads 4 of a transducer disposed in the fluid treatment vessel are shown connected to electrical energizing unit 3. Shielding material member 5 is shown enclosing the fluid treatment vessel and electrical energizing unit to restrict propagation of the at least one pulsed electrical signal produced by the electrical energizing unit and at least one pulsed electromagnetic wave produced by the at least one energized transducer. The processed fluid may then be discharged from port 6 in a single pass application or directed to apparatus 7 of a closed-loop system to allow for additional circulation through the fluid treatment devices. A processed fluid may also be directed to collection basin 8 for additional processing of the fluid.

The electrical energizing unit of the instant pulsed fluid treatment device may establish a pulsed electrical signal having a direct current component. This may be accomplished through a switching sequence comprising initially switching an output of electrical energy to an "on" state during a first time interval to energize at least one transducer with electrical energy flowing from the first conductor lead to the second conductor lead, switching said first output of electrical energy to an "off" state to interrupt the energizing of said at least one transducer, switching an output of electrical energy to the "on" state during a second time interval to energize said at least one transducer with electrical energy flowing from the first conductor lead to the second conductor lead, and switching said second output of electrical energy to the "off" state to interrupt the energizing of said at least one transducer and causing the switching sequence to repeat at a repetition rate. The first and second time intervals and the repetition rate may be substantially constant or one or more of the first and second time intervals and the repetition rate may be variable.

The electrical energizing unit may also establish a pulsed electrical signal having an alternating current component. This may be accomplished through a switching sequence comprising initially switching an output of electrical energy to an "on" state during a first time interval to energize at least one transducer with electrical energy flowing between the first conductor lead to the second conductor lead in a first direction, switching said first output of electrical energy to an "off" state to interrupt the energizing of said at least one transducer, reversing the direction of the flow of electrical energy, switching an output of electrical energy to the "on" state during a second time interval to energize said at least one transducer with electrical energy flowing between the first conductor lead to the second conductor lead in a second direction, switching said second output of electrical energy to the "off" state to interrupt the energizing of said at least one transducer and causing the switching sequence to repeat at a repetition rate. The first and second time intervals and the repetition rate may be substantially constant or one or more of the first and second time intervals and the repetition rate may be variable.

Said electrical energizing unit establishing a pulsed electrical signal having an alternating current component may energize at least one transducer through a switching sequence comprising initially energizing said at least one transducer during a first time interval with electrical energy flowing between the first conductor lead to the second conductor lead in a first direction, switching the direction of the flow of electrical energy and energizing said at least one transducer during a second time interval with electrical energy flowing between the first conductor lead to the second conductor lead in a second direction and causing the switching sequence to repeat at a repetition rate. The first and second time intervals and the repetition rate may be substantially constant or one or more of the first and second time intervals and the repetition rate may be variable.

The electrical energizing unit may have the capacity to vary the direction and amplitude of the pulsed electrical signal over the operation range of a transducer to more evenly distribute energy throughout the fluid treatment chamber. The amplitude of the pulsed electrical signal may be substantially constant or variable. The electrical energizing unit may generate a variety of waveforms including, but not limited to, square waves, sine waves, saw tooth waves, triangle waves or composite waves.

At least one of the time interval, repetition rate, waveform, wavelength, amplitude or direction of the output of electrical energy may be established according to one or more of the composition of the fluid, material comprising the fluid treatment vessel, dimensions of the fluid treatment vessel, embodiment of the at least one transducer, resistance or impedance of the at least one transducer, means for deploying the at least one transducer, material comprising the at least one shielding material member and configuration of the at least one shielding material member.

An electrical energizing unit may energize a single transducer with a pulsed electrical signal or energize a first transducer and a second transducer with a pulsed electrical signal. The electrical energizing unit may provide a plurality of distinct programmable outputs of electrical energy with each output of electrical energy establishing a distinct pulsed electrical signal, wherein a first pulsed electrical signal may energize a first transducer and a second pulsed electrical signal may energize a second transducer. The first pulsed electrical signal may have electrical characteristics substantially equivalent to the second pulsed electrical signal or the first pulsed electrical signal may have electrical characteristics distinct from the second pulsed electrical signal.

In some applications, it may be advantageous to utilize a first electrical energizing unit to energize a first transducer with a first pulsed electrical signal and a second electrical energizing unit to energize a second transducer with a second pulsed electrical signal. The second electrical energizing unit may establish a second pulsed electrical signal having electrical characteristics substantially equivalent to the first pulsed electrical signal or the second electrical energizing unit may establish a second pulsed electrical signal having electrical characteristics distinct from the first pulsed electrical signal.

Figure 2:
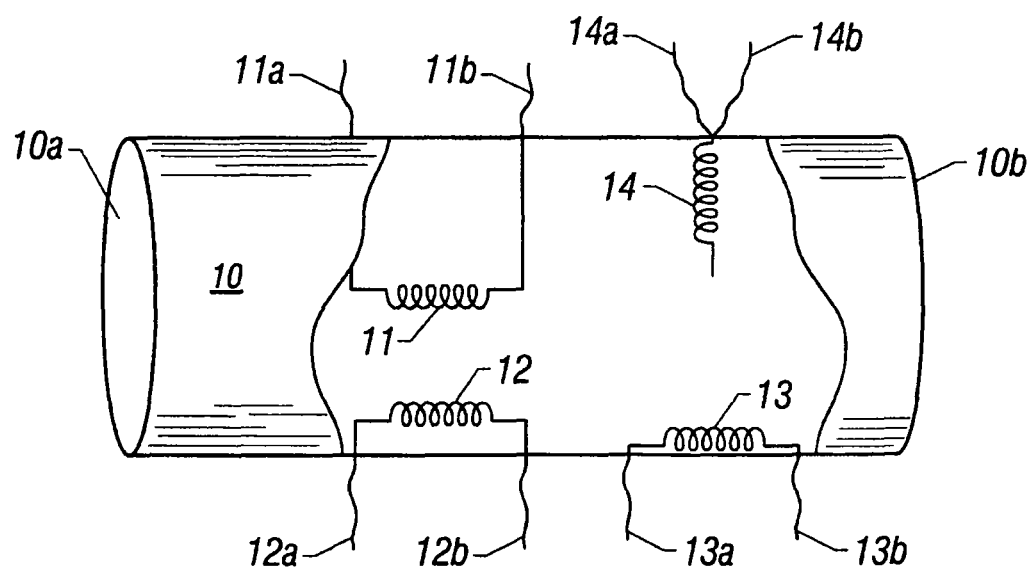
FIG. 2 shows the transducers of the instant invention disposed within the fluid treatment chamber of a fluid treatment vessel.

As shown in FIG. 2, the preferred means of deploying the at least one transducer is to dispose the at least one transducer within the fluid impervious boundary wall of the fluid treatment vessel. Fluid treatment vessel 10 is shown enclosing antenna 11 in substantially concentric surrounding relation with the transducer being coaxially disposed and radially spaced apart from the inner surface of the fluid impervious boundary wall of the fluid treatment chamber.

The at least antenna may be directional or omni-directional in function and enclosed within a housing to protect said antenna from corrosive feedstocks and debris in a feed stream that could affect the performance of the antenna or destroy the antenna.

A feed stream comprising a fluid column receptive to pulsed fluid treatment may be introduced to fluid input port 10a of the fluid treatment vessel to establish a flow of the fluid to be treated through the fluid treatment chamber, then directed to pass through at least one pulsed electromagnetic wave emitted by the antenna. The feed stream may then be discharged from fluid output port 10b of the fluid treatment vessel as a processed fluid.

Fluid treatment vessel 10 is also shown enclosing antenna 12 in substantially eccentric surrounding relation with the transducer disposed proximate and spaced apart from inner surface of the fluid impervious boundary wall of the fluid treatment chamber, and enclosing antenna 13 in substantially eccentric surrounding relation with the transducer disposed in fluid communication inner surface of the fluid impervious boundary wall of the fluid treatment chamber. Antenna 14 is shown extending through the fluid impervious boundary wall of the fluid treatment vessel and into the fluid treatment chamber substantially orthogonal to the direction of the flow of fluid through the fluid treatment chamber.

In some applications, it may be advantageous to deploy an embodiment of the transducer of the at least one transducer substantially diagonal to the direction of the flow of fluid through the fluid treatment chamber. First and second conductor leads 11a and 11b, 12a and 12b, 13a and 13b or 14a and 14b of a transducer may be connected to at least one electrical energizing unit to energize a transducer with at least one pulsed electrical signal and thereby produce pulsed fluid treatment in at least one region within the fluid treatment chamber.

The fluid treatment vessel, at least one transducer and at least one electrical energizing unit may be enclosed within a single shielding material member to restrict the radiation of the at least one pulsed electrical signal, or a shielding material member may enclose any combination the fluid treatment vessel, at least one transducer and at least one electrical energizing unit. Each of the fluid treatment vessel, the at least one transducer and the at least one electrical energizing unit may be enclosed within distinct and dedicated shielding material members so that each component may be individually shielded.

A fluid treatment vessel comprising a material having a capacity to restrict propagation of the at least one pulsed electrical signal may form a shielding material member for the at least one transducer. In such instances, the inner surface of the fluid impervious boundary wall of the fluid treatment vessel may establish a resonant chamber for the at least one pulsed electromagnetic wave.

A length of coaxial cable, comprising an external braid of wire encircling at least one internal strand of electrical conducting material in substantially concentric surrounding relation, may be utilized as a conductor lead of said transducer and connected to the at least one shielded electrical energizing unit, wherein the external braid of wire forms a shielding material member to restrict the radiation of the at least one pulsed electrical signal transmitted through the at least one internal strand of electrical conductor. Other combinations and embodiments of shielding material members may be utilized.

A treated fluid may receive additional pulsed fluid treatment downstream of the instant invention. In some instances, at least one antenna may be disposed in fluid communication with the outer surface of a conduit promoting the flow of a processed fluid to provide additional pulsed fluid treatment. In other applications, a processed fluid may be retained in a collection basin, settling tank, retention pond or similar type of reservoir to allow for gravity separation of suspended and dissolved solids in the processed fluid column. At least one antenna may be deployed within said reservoir to direct additional pulsed fluid treatment to the processed fluid retained within the collection basin prior to discharging the fluid.

Directing a feed stream through at least one pulsed electromagnetic wave may neutralize the electrical charges of many suspended and dissolved solid contaminants in the feedstock, render them non-adhesive and enhance the clarification of the fluid. Water utilized as a heat transfer medium in thermal exchange systems, such as boilers, heat exchangers or cooling towers, may be directed through at least one pulsed electromagnetic wave to retard the formation of scale and other heat insulating deposits in such thermal exchange systems. Directing seawater through the pulsed fluid treatment of the instant invention may improve the efficiency of desalination and reverse osmosis systems. The instant invention may also be utilized to reduce the surface tension of irrigation water to allow for better penetration of the soil to improve feeding of the roots of plants.

Coagulating chemicals are typically used to neutralize the electrical charges of particles suspended in a fluid column. Directing a feedstock to pass through the instant invention may cause suspended and dissolved contaminants in a feed stream to be repelled from the fluid and facilitate removal of solid contaminants, and may thereby reduce the amount of coagulants required for adequate processing of a fluid. Flocculants are commonly injected into wastewater sludge upstream of dewatering equipment and mixed into a feedstock to promote the aggregation of finely dispersed solids suspended in wastewater into particles large enough to be removed by physical separation. Pretreatment of wastewater may result in a reduction of the amount of chemical required for processing while simultaneously generating drier solids and clearer filtrate discharged from dewatering equipment.

Energizing the at least one transducer with certain pulsed electrical signals may generate alternating positive and negative pressure waves in a feed stream that tend to tear fluids apart and create vacuum cavities forming micron-size bubbles. As these bubbles continue to grow under the influence of the alternating positive and negative pressure waves, they reach a resonant size where they then collapse, or implode, under a force known as cavitation. Imploding bubbles form jets of plasma having extremely high temperatures that travel at high rates of speed for relatively short distances. Energy released from a single cavitation bubble is extremely small, but the cavitation of millions of bubbles every second has a cumulative effect throughout a fluid as the pressure, temperature and velocity of the jets of plasma destroy many contaminants in the fluid. The resonant frequency of an energized transducer typically determines the size and magnitude of the cavitation bubbles, with the number of cavities formed typically increasing as the frequency increases. Lower frequencies tend to create larger bubbles with more energy as the available power is concentrated in fewer bands of pulsed fluid treatment, while higher frequencies tend to produce smaller bubbles that distribute power more evenly throughout the fluid treatment chamber. Slight shifts in the resonant frequency of a transducer are preferred to enhance fluid treatment and the repetition rate of a pulsed electrical signal may be programmed to automatically vary on a constant basis. For example, a transducer designed to operate at 20 kHz may be driven by an electrical energizing unit sweeping 19 kHz-21 kHz to transform electrical energy into a signal suitable for generating fluid cavitation. However, an electrical energizing unit may be programmed to produce pulsed electrical signals sweeping an even broader range of frequencies.

The physical properties of high density, low viscosity, middle range surface tension and middle range vapor pressure are ideal conditions for cavitation, with surface tension being a significant factor in determining the intensity of bubble cavitation.

In certain applications, diffused ambient air or other forms of small bubbles may be introduced immediately upstream of the fluid treatment chamber to assist in initiating the cavitation process. Electrolysis of a feedstock may also be utilized to generate small bubbles in a feed stream by energizing at least one pair of electrodes with electrical energy. Each electrode may comprise at least one plate comprising an electrical conducting material and having at least one conductor lead, with each pair of electrodes configured as a substantially parallel array of spaced-apart plates interleaving to form at least one cavity between the facing surfaces of adjacent plates. Each electrode plate may be energized with an electrical charge opposite from its adjacent plate. The conductivity of a feedstock typically influences the voltage required to maintain the level of current required to energize the electrodes. Electron flow between the charged plates, along with electromagnetic field generation, releases oxygen and hydrogen bubbles from many water-based feedstocks that may be useful in initiating the cavitation process. Electrodes may be energized with electrical energy having an alternating current component or a direct current component. It may be desirable to periodically reverse the polarity of the signal applied to such electrodes to reduce the plating of contaminants on the surfaces of the electrodes. In certain applications, a pulsed fluid treatment device or a magnetic field treatment device may be configured upstream of the electrodes to retard plating of the electrodes.

Most biological contaminants regulate their water intake through osmosis via the electrical charge of fats and proteins in their surface membranes. Directing biological contaminants to pass through at least one pulsed electromagnetic wave may overwhelm the electrical fields and charges in the surface membranes of these microorganisms and drive them to an imbalanced state, weakening their cell walls and destroying the membranes. Unlike chemical treatment and other means of controlling many biological contaminants, many organisms may not develop immunity to the instant method of fluid treatment. Further, the utilization of charged electrodes may provide an additional means of destroying biological contaminants in fluids.

Directing an emulsion of oil and water through at least one pulsed electromagnetic wave may cause the water to repel the oil and the oil to repel the water. Pulsed electromagnetic waves may neutralize the charges of many suspended and dissolved solid contaminants that tend to cause emulsions, allowing small oil droplets to coalesce into larger oil droplets, float out of the water and be removed by separation apparatus. Similarly, water may be removed from hydrocarbon fluids. At least one pair of charged electrodes may be utilized in concert with the instant invention to break many of the bonds that create many types of emulsions.

At least one chemical dispersing apparatus providing means for distributing a supply of at least one fluid treatment chemical into a fluid directed to pass through at least one pulsed electromagnetic wave may be utilized to disperse a supply of at least one chemical into a feed stream upstream of the fluid treatment vessel, into the fluid treatment vessel or downstream of the fluid treatment vessel. Fluid treatment chemicals may be selected from a group consisting of but not limited to, algaecides, biocides, scale retardants, coagulants, flocculants, pesticides, fertilizers, coolants, ambient air, oxygen, hydrogen, ozone, hydrogen peroxide, surfactants, petroleum production fluid additives, fuel additives and lubricant additives. As used herein, charged electrodes generating oxygen and hydrogen bubbles in the electrolysis of water-based feedstocks may comprise a chemical dispersing apparatus.

In some instances, chemical pretreatment may hamper the efficiency of separation apparatus, such as screening devices that tend to blind off with chemically treated feedstocks, and hydrocyclones, desanders and desilters. Improved removal of suspended and dissolved solid contaminants from a fluid may be achieved by directing a feed stream free of coagulants or flocculants to pass through at least one pulsed electromagnetic wave upstream of such apparatus to enhance the separation of solids from a fluid.

At least one contaminant separation apparatus providing means for separating and collecting a volume of contaminants from a fluid and discharging a processed feed stream having a reduced volume of contaminants carried within a treated fluid column may be utilized to treat a feed stream upstream of the fluid treatment vessel or downstream of the fluid treatment vessel. Contaminant separation apparatus may be selected from a group consisting of, but not limited to, phase separation systems, solids separation equipment, dewatering devices, oil/water separators, petroleum production equipment, petroleum refining systems, water filters, desalination equipment, reverse osmosis systems, fuel filters and lubricant filters.

At least one fluid flow conditioning apparatus providing means for altering the flow of a fluid directed to pass through at least one pulsed electromagnetic wave may be utilized to alter the flow of a feed stream upstream of the fluid treatment vessel, within the fluid treatment vessel or downstream of the fluid treatment vessel. Fluid conditioning apparatus may be selected from a group consisting of, but not limited to, pumps, blowers, vortex inducing equipment, static mixing devices and dynamic mixing apparatus to create turbulence in a flow of fluid or laminar flow conditioners to remove turbulence from a flow of fluid.

The foregoing description of the preferred embodiment has been for the purpose of explanation and illustration. It will be appreciated by those skilled in the art that modifications and changes may be made without departing from the essence and scope of the present invention. Therefore, it is contemplated that the appended claims will cover any modifications or embodiments that fall within the scope of the invention.

What is claimed is:

1. A method of neutralizing charges of solid contaminants and weakening cell walls and membranes of biological contaminants in a fluid, comprising the steps of:

establishing a flow of a fluid through a fluid treatment chamber surrounded by a sidewall of a fluid treatment vessel shaped as a conduit having a fluid input port, and a fluid output port, the sidewall constructed of a shielding material; and energizing a coil of at least one antenna within the fluid treatment chamber with at least one electrical energizing unit to produce pulsed radiation within the fluid treatment chamber to treat the flow of the fluid therein, wherein the sidewall of the fluid treatment vessel establishes a chamber having a capacity to restrict propagation of the pulsed radiation out of the fluid treatment vessel.

2. The method of claim 1, further comprising the step of dispersing at least one fluid treatment chemical into the fluid.

3. The method of claim 1, further comprising the step of directing the fluid to pass through at least one contaminant separation process.

4. The method of claim 1, further comprising the step of directing the fluid to pass through at least one fluid flow conditioning process.

5. An apparatus for neutralizing charges of solid contaminants and weakening cell walls and membranes of biological contaminants in a fluid, comprising:

a fluid treatment vessel shaped as a conduit having a fluid input port, a fluid output port, and a fluid treatment chamber surrounded by a sidewall of the fluid treatment vessel, the sidewall constructed of a shielding material establishing a chamber having a capacity to restrict propagation of pulsed radiation out of the fluid treatment vessel;

at least one coil of at least one antenna deployed within the fluid treatment chamber and comprising at least one length of electrical conducting material; and at least one electrical energizing unit operably connected to the at least one coil to energize the at least one antenna to establish the pulsed radiation within the fluid treatment chamber.

6. The apparatus of claim 5, wherein the at least one electrical energizing unit establishes a pulsed electrical signal having a direct current component through a switching sequence comprising the steps of switching a first output of electrical energy to an "on" state during a first time interval to energize the at least one coil of the at least one antenna with electrical energy, switching the first output of electrical energy to an "off" state during a second time interval, and causing the switching sequence to repeat at a repetition rate.

7. The apparatus of claim 6, wherein the first time interval, the second time interval, and the repetition rate are substantially constant.

8. The apparatus of claim 6, wherein at least one of the first time interval, second time interval, and the repetition rate are variable.

9. The apparatus of claim 5, wherein the at least one electrical energizing unit establishes a pulsed electrical signal having an alternating current component.

10. The apparatus of claim 9, wherein the alternating current component has a substantially constant frequency.

11. The apparatus of claim 9, wherein the alternating current component has a substantially variable frequency.

12. The apparatus of claim 5, further comprising at least one conductor extending between the electrical energizing unit and the at least one coil, and a shielding member disposed about the at least one conductor.

13. The apparatus of claim 12, wherein the at least one conductor and the shielding member are components of a coaxial cable.

14. The apparatus of claim 9, wherein the pulsed electrical signal has a substantially constant amplitude.

15. The apparatus of claim 9, wherein the pulsed electrical signal has a substantially variable amplitude.

16. The apparatus of claim 5, wherein the at least one antenna is coaxially disposed and radially spaced apart from an inner surface of the fluid treatment vessel.

17. The apparatus of claim 5, wherein the at least one antenna is non-coaxially disposed with respect to the fluid treatment vessel.

18. The apparatus of claim 5, wherein the fluid treatment vessel has a fluid impervious boundary wall, and the at least one electrical conducting material extends through the fluid impervious boundary wall and into the fluid treatment chamber.

19. The apparatus of claim 5, further comprising at least one chemical dispersing apparatus upstream of the fluid treatment vessel.

20. The apparatus of claim 5, further comprising at least one contaminant separation apparatus downstream from the fluid treatment vessel.

21. The apparatus of claim 5, further comprising at least one fluid flow conditioning apparatus upstream of the fluid treatment vessel.

22. The apparatus of claim 5, wherein the sidewall encloses the electrical energizing unit to restrict propagation of pulsed electrical signals produced by the electrical energizing unit.

23. The apparatus of claim 5, wherein the shielding material is a first shielding material, and wherein the apparatus further comprises a second shielding material enclosing the electrical energizing unit to restrict propagation of pulsed electrical signals produced by the electrical energizing unit.

\* \* \* \* \*